No. 897,704.
PATENTED SEPT. 1, 1908.
W. BAUMGARDNER.
CLUTCH PULLEY.
APPLICATION FILED MAY 13, 1908.
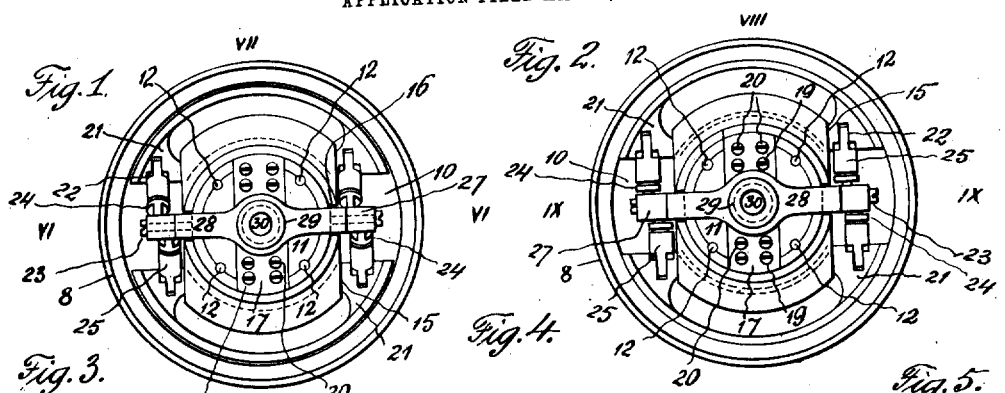
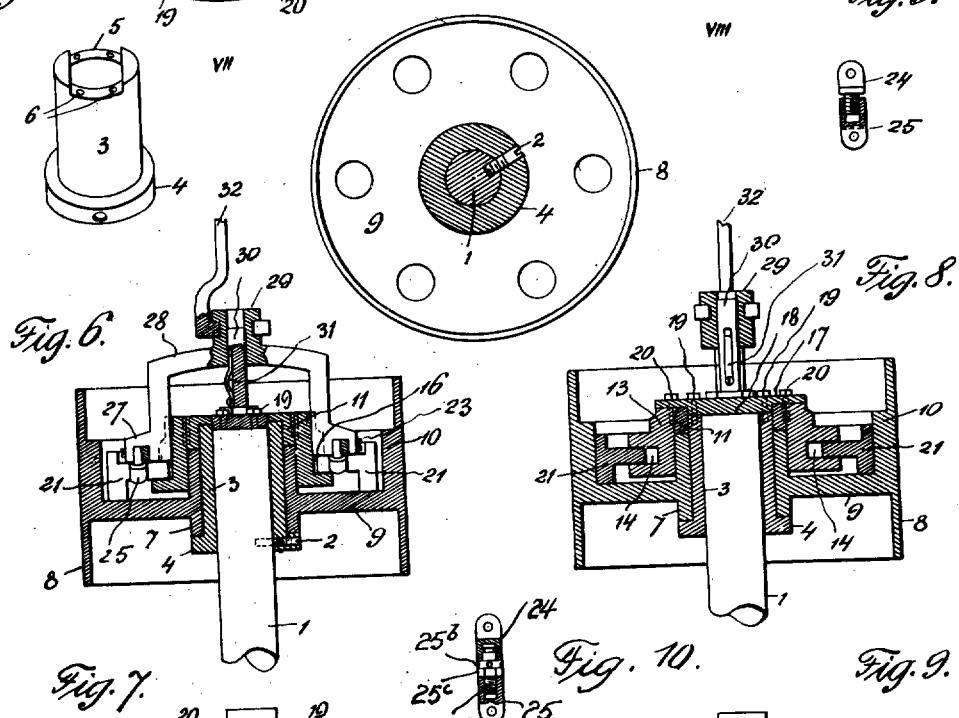
Witnesses
A. H. Rabsag,
A. H. Butler.
Inventor
W. BAUMGARDNER
By H. C. Everett & Co.
Attorneys

UNITED STATES PATENT OFFICE.

WILLIAM BAUMGARDNER, OF ZELIENOPLE, PENNSYLVANIA.

CLUTCH-PULLEY.

No. 897,704.  Specification of Letters Patent.  Patented Sept. 1, 1908.

Application filed May 13, 1908. Serial No. 432,665.

*To all whom it may concern:*

Be it known that I, WILLIAM BAUMGARDNER, a citizen of the United States of America, residing at Zelienople, in the county of Butler and State of Pennsylvania, have invented certain new and useful Improvements in Clutch-Pulleys, of which the following is a specification, reference being had therein to the accompanying drawing.

This invention relates to clutches, and the primary object of my invention is to provide positive and reliable means for gripping a pulley loosely mounted upon a shaft and causing said pulley to rotate therewith.

A further object of this invention is to provide a simple, durable and inexpensive clutch that can be easily and quickly operated.

The above objects are accomplished by a structure that will be presently described and then specifically pointed out in the appended claims.

Referring to the drawings forming a part of this specification, Figure 1 is an end view of my clutch with the gripping shoes thereof in a retracted position. Fig. 2 is a similar view with the shoes thereof in an extended or gripping position, Fig. 3 is a perspective view of a sleeve forming part of my invention, Fig. 4 is a cross sectional view of my clutch illustrating the pulley thereof in elevation, Fig. 5 is a detail view of an adjustable toggle link, Fig. 6 is a horizontal sectional view on the line VI—VI of Fig. 1. Fig. 7 is a vertical sectional view taken on the line VII—VII of Fig. 1. Fig. 8 is a vertical sectional view taken on the line VIII of Fig. 2, Fig. 9 is a horizontal sectional view taken on the line IX of Fig. 2, and Fig. 10 is a view of a modified form of toggle link.

In the accompanying drawings, 1 designates a revoluble shaft and upon this shaft there is fixed by a screw 2 a sleeve 3 having one end provided with a peripheral flange 4, while the opposite end thereof is provided with a recess 5 and screw threaded openings 6.

Revolubly mounted upon the sleeve 3 is a hub 7 of a pulley wheel 8, said hub being of a less length than said sleeve. The pulley wheel 8 is formed adjacent to the web or spokes 9 thereof with an annular enlargement 10 providing one of the gripping surfaces of the clutch.

Mounted upon the sleeve 3 is a cap 11 and secured to said cap by rivets or pins 12 is a collar 13 having a peripheral groove 14. Diametrically opposed edges of the collar 13 are cut away or flattened as at 15 to provide clearance for toggle links, as will presently appear. These cut away or flattened edges are provided with vertical grooves 16 for guiding a yoke employed for actuating the toggle links and gripping shoes of my clutch.

The cap 11 and the collar 13 are fixed upon the sleeve 5 by a cross head 17, said cross head fitting in the cap 11 and having a depending portion 18 secured in the recess 5 of the sleeve 3 by screws 19, while the ends of the cross head are secured to the cap 11 and the collar 13 by screws 20. Movably mounted in the peripheral groove 14 of the collar 13 are two oppositely disposed segment shaped gripping shoes 21, said shoes being substantially T-shaped in cross section. The confronting edges of shoes 21 are slotted, as at 22 and provided with pivoted pins or screws 23 for toggle links, each link comprises two adjustable members 24 and 25. The members 25 are carried by the pins or screws 26, and the members 24 are pivotally mounted upon the pins or screws 26 arranged in the bifurcated ends 27 of a yoke 28, said yoke being movably guided in the vertical oppositely disposed grooves 16 of the collar 13.

The yoke 28 is provided with a central opening to receive a guide pin 30, and with a collar 29 against which an operating lever 32 of a conventional form is adapted to engage for moving the yoke 28. The pin 30 is provided with a spring 31, the tension of which is greater than the centrifugal force of the clutch when not in operation, consequently, the tendency of the gripping shoes to move outwardly and engage the enlargement 10 is easily avoided.

Operation:—The function of the spring 31 is to normally hold the gripping shoes 21 out of engagement with the surface of the enlargement 10 of the pulley wheel 8. When the yoke 28 is pushed inwardly towards the crosshead 17, the gripping shoes 21 are forced outwardly to frictionally engage the enlargement 10 of the pulley wheel. This is accomplished through the medium of the toggle links, and since these links can be adjusted when detached from either the yoke or the gripping shoes, the clamping force of the shoes can be decreased or increased as may be desired, but these adjustable links are principally provided to compensate for the wear upon the gripping shoes and the enlargement 10 engaged by said shoes.

In Fig. 10 of the drawings, I have illustrated a modified form of toggle link, wherein the members 24 and 25 can be adjusted without detaching the same. This is accomplished by a screw 25$^a$, an apertured head 25$^b$ and a jam nut 25$^c$.

I reserve the right to make the collar 13 and the cap 11 in one piece.

It is thought that the utility and operation of my clutch will be fully understood, and while in the accompanying drawings there is illustrated a preferable form of construction embodying the invention, it is to be understood that the elements may be varied or changed as to shape, proportion, and exact manner of assemblage without departing from the spirit of the invention.

Having now described my invention what I claim as new, is;—

1. A clutch embodying a revoluble shaft, a sleeve mounted thereon, a pulley wheel revolubly mounted upon said sleeve and having an interior annular enlargement providing a gripping surface, a cap mounted upon said sleeve, a collar fixed to said cap, and having a peripheral groove formed therein, said collar having oppositely disposed cut away sides provided with vertical guide grooves, a cross head secured to said sleeve and to said cap, a guide pin carried by said cross head, oppositely disposed segment shaped shoes movably mounted in the groove of said collar and adapted to frictionally engage said enlargement, adjustable toggle links pivotally connected to the confronting faces of said shoes, a yoke movably mounted upon said guide pin and adapted to engage in the vertical grooves of said collar, said yoke having bifurcated ends adapted to be connected to said links, and a spring carried by said guide pin between said cross head and said yoke.

2. A clutch embodying a revoluble shaft, a sleeve mounted thereon, a pulley wheel revolubly mounted upon said sleeve, a cap mounted upon said sleeve, a collar secured to said cap, said collar having a peripheral groove formed therein, oppositely disposed segment shaped shoes movably mounted in said groove and adapted to frictionally engage said pulley wheel, a cross head secured to said sleeve and to said cap, a guide pin carried by said cross head, a yoke movably mounted upon said pin and having bifurcated ends engaging said collar, adjustable toggle links connecting the bifurcated ends of said yoke with the confronting face of said shoes, and means arranged between said yoke and said cross head for normally holding said shoes out of engagement with said pulley wheel.

In testimony whereof I affix my signature in the presence of two witnesses.

WILLIAM BAUMGARDNER.

Witnesses:
J. F. SCHAFFER,
CHARLES STOKEY.